US012642281B2

(12) United States Patent (10) Patent No.: US 12,642,281 B2
Mizushima (45) Date of Patent: Jun. 2, 2026

(54) OIL/FAT COMPOSITION

(71) Applicant: FUJI OIL CO., LTD., Osaka (JP)

(72) Inventor: Shigeki Mizushima, Izumisano (JP)

(73) Assignee: FUJI OIL CO., LTD., Osaka (JP)

( * ) Notice: Subject to any disclaimer, the term of this patent is extended or adjusted under 35 U.S.C. 154(b) by 1001 days.

(21) Appl. No.: 17/437,243

(22) PCT Filed: Mar. 10, 2020

(86) PCT No.: PCT/JP2020/010227
§ 371 (c)(1),
(2) Date: Sep. 8, 2021

(87) PCT Pub. No.: WO2020/184548
PCT Pub. Date: Sep. 17, 2020

(65) Prior Publication Data
US 2022/0167639 A1 Jun. 2, 2022

(30) Foreign Application Priority Data
Mar. 13, 2019 (JP) ................................. 2019-045431

(51) Int. Cl.
*A23D 7/005* (2006.01)
*A23D 7/01* (2006.01)

(52) U.S. Cl.
CPC ............ *A23D 7/0056* (2013.01); *A23D 7/011* (2013.01)

(58) Field of Classification Search
None
See application file for complete search history.

(56) References Cited

U.S. PATENT DOCUMENTS

2015/0159117 A1 6/2015 Kano et al.
2020/0347300 A1 11/2020 Kato et al.

FOREIGN PATENT DOCUMENTS

| EP | 3 425 033 | | 1/2019 |
|---|---|---|---|
| JP | 63-135483 | | 6/1988 |
| JP | 08228678 | | 9/1996 |
| JP | 2000-157168 | | 6/2000 |
| JP | 2000-229118 | | 8/2000 |
| JP | 2000229118 A | * | 8/2000 |
| JP | 2002-142673 | | 5/2002 |
| JP | 4165678 | | 10/2008 |
| JP | 5260179 | | 8/2013 |
| JP | 2013-172680 | | 9/2013 |
| JP | 5652557 | | 1/2015 |
| JP | 2016-145309 | | 8/2016 |
| JP | 6027749 | | 11/2016 |
| JP | 2017-060439 | | 3/2017 |
| WO | 2017/150558 | | 9/2017 |

OTHER PUBLICATIONS

Oriz et al., "Current Trends in Pickering Emulsions Particle Morphology and Applications". Engineering 6 (2020) 468-482 (Year: 2020).*
International Search Report issued May 26, 2020 in International (PCT) Application No. PCT/JP2020/010227, with English translation.
International Preliminary Report on Patentability and Written Opinion of the International Searching Authority issued Aug. 25, 2021 in International (PCT) Application No. PCT/JP2020/010227, with English translation.
Office Action issued May 16, 2024 in Chinese Patent Application No. 202080020404.0, with English-language translation.
Extended European Search Report issued Oct. 4, 2022 in corresponding European Patent Application No. 20770160.8, 8 pages.

* cited by examiner

*Primary Examiner* — Erik Kashnikow
*Assistant Examiner* — Assaf Zilbering
(74) *Attorney, Agent, or Firm* — Wenderoth, Lind & Ponack, L.L.P.

(57) ABSTRACT

The present invention addresses the problem of providing an edible oil or fat that is usable for any kinds of foods, has an improved oxidation stability and shows a good flavor. A tea extract and sorbitol are stably dispersed in an oil or fat. Thus, the oxidation stability can be improved without increasing the content of the tea extract.

5 Claims, No Drawings

OIL/FAT COMPOSITION

TECHNICAL FIELD

The present invention relates to a fat composition with improved oxidative stability, a food containing the same, and a method for producing the same.

BACKGROUND ART

Due to increasing social concern about health problems such as aging society, and increase in medical costs, there is needed to provide products for health, and there has been a similar demand for a fat which is indispensable to food cooking.

In addition, reducing food waste is required due to recent increased environmental awareness, and there is a growing demand for long-term storable food due to frequent disasters. In other words, society demands that shelf life of food and raw materials thereof be extended.

Fat is known to deteriorate similarly to other substances. For example, peroxide substances produced due to oxidization of fat may impair not only flavor but also human health. Therefore, fat for health may be provided by preventing oxidization.

An oxidative stability of food is one of the most important functions because it may directly or indirectly affect a determination of shelf life of food. Thus, various methods have been tried to improve the oxidative stability of food. In addition, fat is one of the most important components of food. However, fat is easily oxidized. Thus, improving the oxidative stability of fat is particularly important problem for a food containing fat.

An addition of antioxidant is commonly used for improving the oxidative stability of fat and food containing fat. An oil-soluble antioxidant, which is easily dispersed in fat, is used as the antioxidant. However, an antioxidant capacity of the oil-soluble antioxidant is relatively low compared to that of a water-soluble antioxidant. Thus, in certain cases, the water-soluble antioxidant is used with dispersed it in fat. As the water-soluble antioxidant, a tea extract is an effective additive, and several methods have been disclosed for dispersing it in fat to improve the oxidative stability of fat or food rich in fat.

As a method for improving a dispersibility of tea extract in fat, for example, Patent Document 1 discloses a method including grinding tea leaves to an average particle diameter of about 15 microns in a dry state, adding the ground leaves to an edible oil, subjecting the mixture to a fine powdering process using a wet ultrafine grinder until the tea leaves have a particle diameter of 1 to 10 microns to promote a transfer of components of tea leaves to the edible oil, and then removing the fine powder of tea leaves to obtain an oily solution. In addition, Patent Document 2 discloses a method of producing a catechin-dispersed fat including adding a green tea extract containing a green tea-derived hexane soluble at a ratio of 10% by mass or more with respect to catechin to at least one fat with a specific gravity of 0.95 g/cm3 or higher selected from medium chain fatty acid triglyceride and castor oil, heating the mixture to 100 to 130° C., and fine grinding the mixture, where the green tea extract is recovered by combining extracts extracted multiple times from green tea leaves using hydrous organic solvents with different concentrations and with concentration (vol/vol) of 60% or more. Further, Patent Document 3 discloses an antioxidant composition characterized by dissolving 0.1 to 30 parts by weight of catechin in 70 to 99.9 parts by weight of diglycerin fatty acid ester.

As a method of dissolving a tea extract in polar solvent, Patent Document 4 discloses a lipophilic antioxidant prepared by emulsifying gallic acid, water-soluble antioxidant and oil-soluble antioxidant into oil-in-water form with a lipophilic emulsifier. Patent Document 5 discloses an oil-soluble antioxidant capable of dispersing transparently in fat, including an emulsion containing catechins, which are water-soluble antioxidants derived from natural products, polyglycerin fatty acid ester having HLB from 14 to 16 and water, as the aqueous phase components, and fatty acid triglyceride having 6 to 12 carbon atoms and polyglycerol condensed ricinoleic acid ester, as the oil phase components, where an average particle size of the emulsion particles of the catechins is 40 to 120 nm. Patent Document 6 discloses a method of producing an oil-soluble antioxidant including the steps of: (a) dissolving a green tea extract powder having a polyphenol content of 80 wt % or more in ethanol or propylene glycol; (b) emulsifying the dissolved green tea extract while sequentially adding emulsifiers (A), (B), and (C) having HLB values of 3.5 to 4.0, 3.0 to 3.5, and 2 or less, respectively, to the dissolved green tea extract. Patent Document 7 discloses a method of improving a stability of edible oil in an oxidation reaction including: a. mixing at least one hydrophilic natural antioxidant in a highly polar oil at a temperature of 5 to 200° C. to obtain an antioxidant-oil mixture containing 0.04 to 50% by weight of the hydrophilic natural antioxidant; b. mixing the above antioxidant-oil mixture in the edible oil such that a content of the hydrophilic natural antioxidant in the edible oil is 10 to 1000 ppm by weight. Patent Document 8 discloses a method of producing an edible vegetable fat (excluding fat having a diglyceride content of 15% by weight or more) having a water-soluble tea polyphenol content of 300 to 600 ppm by weight, an emulsifier content of 200 to 800 ppm by weight, the emulsifier content of 1.5 times or less than the water-soluble tea polyphenol content, and an A/N value of 2.9 or more, including adding an aqueous solution containing the water-soluble tea polyphenol in a solution state to the fat.

PRIOR ART DOCUMENTS

Patent Documents

Patent Document 1: JP S63-135483 A
Patent Document 2: JP 5260179 B
Patent Document 3: JP 2015-037381 A
Patent Document 4: JP 2002-142673 A
Patent Document 5: JP 6027749 B
Patent Document 6: JP 4165678 B
Patent Document 7: JP 2015-188374 A
Patent Document 8: JP 5652557 B

SUMMARY OF INVENTION

Problems to be Solved by Invention

All of these conventional technologies aim to improve the antioxidant property of fat by dispersing a tea extract or a tea polyphenol, which are antioxidants, in the fat to demonstrate their functions.

However, a tea extract itself has astringency and off-taste. Thus, there is a problem that an excessive amount of tea extract may impair the taste of the fat or the food containing the fat. In other words, even if only the tea extract could ideally be dispersed in fat to provide antioxidant property, the taste may be deteriorated by the tea extract itself.

With recognizing the conventional technologies, an object of the present invention is to provide an edible fat containing a tea extract with improved oxidative stability and good taste without increasing the amount of the tea extract.

Means for Solving Problems

The present inventors have intensively studied to solve the above problems. As a result, they have found that an edible fat having an improved oxidative stability and good taste is obtained by adding sorbitol in a production method of adding a tea extract, which is inherently insoluble in fat, in a solution state with an aqueous medium to fat. The present invention has been completed based on the findings.

That is, the present invention is:
(1) a fat composition including 50 to 1000 ppm by mass tea extract, and sorbitol at 0.5 to 15 times as much as the tea extract;
(2) the fat composition of (1), including an oil-soluble emulsifier;
(3) the fat composition of (1) or (2), where an average particle size of an aqueous phase of the composition is 1000 nm or less;
(4) the fat composition of any of (1) to (3), including 80 to 800 ppm by mass tea extract;
(5) a food including the fat composition of any of (1) to (4);
(6) a method of producing the fat composition of any of (1) to (4), including mixing an oil phase and an aqueous phase, where the aqueous phase is an aqueous solution dissolving a tea extract and sorbitol;
(7) the method of producing the fat composition of (6), where the aqueous phase contains water at 1 to 5 times as much as the tea extract;
(8) a method of improving an oxidative stability of a fat composition, including adding a tea extract and sorbitol into an aqueous phase which is dispersed into the fat composition in a production of the fat composition.

Effect of Invention

The present invention enables to provide an edible fat with improved oxidative stability and good taste that may be used in all kinds of foods.

In a preferred aspect, a tea extract and sorbitol are stably dispersed in the fat composition of the present invention. In addition, the fat composition of the present invention may be efficiently and stably dispersed in a food.

Mode for Carrying Out Invention

In the present invention, an oxidative stability may be improved without increasing an adding amount of tea extract by adding sorbitol. Sorbitol, which is a sugar alcohol, has no effect on improving the oxidative stability of fat.

It is presumed that the sorbitol may be a guiding factor for polyphenols to lipid peroxides, which are relatively polar in fat, by coexisting the sorbitol with the polyphenols contained in the tea extract, and thereby may reinforce an expression of the antioxidant function of the polyphenols. Furthermore, it is presumed that the antioxidant function of the tea polyphenols may be enhanced by imparting stability to the polyphenols.

The fat composition of the present invention contains 50 ppm by mass to 1000 ppm by mass tea extract and sorbitol at 0.5 to 15 times as much as the tea extract. Examples of the tea extract include extract of tea leaves, such as green tea, oolong tea, and black tea, or extract of processed product thereof, where the extract may be extracted with water or alcohol. It is preferable to use a green tea extract, and a commercially available green tea extract may be used.

A content of the tea extract in the fat composition of the present invention is preferably 80 ppm by mass to 800 ppm by mass, more preferably 100 ppm by mass to 600 ppm by mass, further preferably 150 ppm by mass to 400 ppm by mass. When it is too small, the effect of improving oxidative stability may not be obtained, and when it is too large, it may affect the taste, which are not preferable.

A content of the sorbitol in the present invention is 0.5 to 15 times, preferably 0.5 to 10 times, more preferably 0.5 to 5 times, further preferably 0.5 to 4 times, further more preferably 1.5 to 4 times, most preferably 1.5 to 3 times, as much as the tea extract. When the adding amount of sorbitol with respect to the tea extract is too small, the effect of improving the oxidative stability may not be obtained, and when it is too large, the dispersion stability of the tea extract in fat may be impaired and the oxidative stability may be lowered, which are not preferable.

Examples of fats that may be used for the fat composition of the present invention include vegetable fats such as rapeseed oil, soybean oil, sunflower seed oil, cotton seed oil, groundnut oil, rice bran oil, corn oil, safflower oil, olive oil, kapok oil, sesame oil, evening primrose oil, palm oil, palm kernel oil, coconut oil, medium-chain triglyceride (MCT), shea butter, and sal fat; animal fats such as milk fat, beef tallow, lard, fish oil, and whale oil; algae oil; and processed fat thereof such as hydrogenated oil, fractionated oil, hydrogenated fractionated oil, fractionated hydrogenated oil, and interesterified oil; and mixed fat thereof. In terms of workability, it is preferable to use fat in liquid form at room temperature, such as palm olein, rapeseed oil, soybean oil, and sunflower seed oil.

In the fat composition of the present invention, an oil-soluble emulsifier is desirably dissolved in the oil phase in order to maintain good dispersion stability. The oil-soluble emulsifier is an emulsifier that may be dissolved in fat, and refers to an emulsifier having an HLB of 7 or less in the present invention. As the oil-soluble emulsifier, one or more selected from polyglycerol ester, sugar ester, sorbitan ester, and monoglycerin fatty acid ester are desirable, more desirably, polyglycerol ester, sugar ester, and distilled monoglyceride are preferred, particularly, polyglycerol ester is preferred, and polyglycerol condensed ricinoleic acid ester is most preferable. Polyglycerol condensed ricinoleic acid ester may be abbreviated as PGPR. The amount of the oil-soluble emulsifier in the oil phase is preferably 0.1 to 10 times, more preferably 0.3 to 7 times, and further preferably 0.5 to 5 times as much as the tea extract. By using an appropriate amount of an appropriate emulsifier, the dispersion stability of tea extract may be improved, and thereby the function of tea extract-containing fat composition may be exerted. In case that the amount of the emulsifier is excessive, when the fat composition of the present invention is used for food, decrease in eating quality due to taste derived from the emulsifier and unintended inhibition of emulsification may occur, which impairs the quality of food.

The fat composition of the present invention is prepared so that an average particle size of the aqueous phase containing the tea extract is preferably 1000 nm or less, more preferably 500 nm or less, further preferably 300 nm or less. It is preferable to make the average particle size 1000 nm or less because it allows the tea extract to be stably dispersed.

When the average particle size exceeds 1000 nm, the dispersion stability may deteriorate, which is not preferable. In the present invention, the average particle size is determined by dynamic light scattering method. When the average particle size exceeds 1000 nm, it is difficult to determine by dynamic light scattering method, so it is determined by laser diffraction.

A method of producing the fat composition of the present invention is not particularly limited as long as the fat composition described above may be obtained. An example is a method including mixing an aqueous solution in which a tea extract and sorbitol are dissolved with an oil phase. It is not necessary to dissolve the tea extract and the sorbitol in the same aqueous solution.

An example of a method of producing the fat composition of the present invention is a method including mixing an oil phase and an aqueous phase, where the aqueous phase is an aqueous solution dissolving a tea extract and sorbitol In the preferred aspect of the aqueous solution in which a tea extract and sorbitol are dissolved, the aqueous phase contains water at 1 to 5 times, more preferably 1 to 4.5 times, further preferably 1 to 4 times, further more preferably 1 to 3 times, most preferably 1 to 2 times as much as the tea extract.

For mixing the oil phase and the aqueous phase, an apparatus such as mixer and agitator may be used. The apparatus is not particularly limited, and preferably may prevent air being mixed during mixing and agitation. An example is mixing and emulsifying apparatus such as high-pressure homogenizer.

The fat composition of the present invention contains a tea extract and sorbitol, and has favorable dispersion stability, and may exhibit favorable oxidative stability. An evaluation of the fat composition of the present invention may be carried out by obtaining an indicator for evaluation of oxidative stability of fat with a CDM (Conductmetric Determination Method) test. A greater measurement value of the CDM indicates excellent oxidative stability. The CDM test may be performed using a dedicated test instrument (Rancimat). The specific measurement method of this method is also described in Examples. All the measurement methods are an acceleration test performed at a higher temperature than presumed use aspect.

The fat composition of the present invention may be adapted for a wide range of concentration of the tea extract, and thus may be used for various foods. Examples of the food include seasoning such as dressing and mayonnaise, taste filling and spread such as pizza sauce, margarine and shortening, cooked food such as retort curry, roux such as stew and curry, frozen food such as fried chicken, dressed bread, processed meat such as sausage, fish paste such as hanpen or food prepared by cooking these products, rice confectionery such as fried rice cracker, snack food such as potato chip, corn snack, and pretzel, frozen dessert, ice mix, and other confectionery and Japanese confectionery in which taste may be felt.

Preferred examples include rice cracker, corn snack (coating oil), filling and spread, sauce, soup, beverage, fat for preventing rice binding, and frozen confectionery, which require little heating during production.

The fat composition of the present invention contains a tea extract as an essential component. In addition, the fat composition may contain another antioxidant in combination to the extent that it does not interfere with the effect of the present invention. Examples of the other antioxidant include oil-soluble antioxidant such as tocopherol, myrica extract, and polyphenol derived from grape juice, and water-soluble antioxidative substance such as ascorbic acid and derivative thereof, and gallic acid and derivative thereof. Such antioxidants may be used in combination.

The fat composition of the present invention may contain arbitrary components other than emulsifier and antioxidant, such as colorant, antifoaming agent, and flavor, as long as the effect of the present invention is not impaired. The total amount of the arbitrary components to be blended is preferably 5% by mass or less, more preferably 3% by mass or less, and most preferably 1% by mass or less in the fat composition of the present invention.

EXAMPLES

Hereinafter, the present invention will be described in detail by way of Examples. In Examples, % and part are weight basis.

OTest Examples 1-3

Preparation Method

An oil phase part was prepared in accordance with the formulation described in the column of the oil phase of formulation of fat composition in Tables 1-3. Similarly, an aqueous phase part was prepared in accordance with the formulation described in the column of aqueous phase of formulation of fat composition in Tables 1-3. A temperature of the oil phase part was set to be 25° C., and the aqueous phase part was blended while stirring by HOMOMIXER (TK homomixer MARKII: available from PRIMIX Corporation) at 8,000 rpm. Stirring was performed in this state for 10 minutes to obtain fat composition containing a tea extract and sorbitol.

(Raw Materials and Additives Used)

As fat, "refined rapeseed oil", or palm olein "Palm Ace N", these are manufactured by Fuji Oil Co., Ltd., were used.

As PGPR, a polyglycerol condensed ricinoleic acid ester "CRS-75", manufactured by Sakamoto Yakuhin Kogyo Co., Ltd., was used.

As a tea extract, product name "Sunphenon 90S", manufactured by Taiyo Kagaku Co., Ltd., the content of polyphenol is 80% or more, was used.

As sorbitol, "Sorbitol FP", manufactured by B Food Science Co., Ltd., was used.

As sucrose, "Sucrose", manufactured by FUJIFILM Wako Pure Chemical Corporation, was used.

As glycerin, "glycerin food additive", manufactured by Kishida Chemical Co., Ltd., was used.

As erythritol, "ZEROSE", manufactured by Cargill Japan, Incorporated, was used.

As mannitol, "Mannitol", manufactured by B Food Science Co., Ltd., was used.

As lactitol, "Lactitol LC-0", manufactured by B Food Science Co., Ltd., was used.

As maltitol, "MALTIDEX", manufactured by Cargill Japan, Incorporated, was used.

As glucose, "Glucose", manufactured by Wako Pure Chemical Corporation, was used.

As trehalose, "Treha", manufactured by Hayashibara Co., Ltd., was used.

Evaluation Method

Average Particle Size:

An average particle size was determined by dynamic light scattering. If the particle size was exceeding 1000 nm, it was determined by laser diffraction method.

Evaluation of Oxidative Stability of Fat Composition Containing Tea Extract and Sorbitol:

A CDM value was determined and evaluated by a CDM value in accordance with "the stability test" of the CDM test of the method of the JOCS Standard Methods for the Analysis of Fats and Oils (2.5.1.2-1996) (definition: a clean air is supplied while a sample is heated at 120° C. in a reactor; a volatile decomposition product generated by oxidization is collected in water; and time until the inflection point where the conductivity of water changes rapidly is the CDM value).

The rate (%) of increase of CDM value was calculated in comparison to the sorbitol-free group, which contained the same amount of tea extract and no sorbitol (for example, in the case of Example 1, the rate of increase of CDM value was calculated in comparison to Example 2, which contained the same amount of tea extract). The fat composition having an extension effect of 10% or more with respect to the CDM value of the composition containing the same amount of tea extract and no sorbitol was regarded as acceptable.

Evaluation of Astringency and Off-Taste of Fat Composition Containing Tea Extract and Sorbitol:

Taste evaluation was carried out on the fat obtained in Examples and Comparative Examples. Taste evaluation was carried out by four trained panelists. Taste evaluation point was determined by agreement by the panelists. When the point was 1 or more, astringency and off-taste were regarded as acceptable.

2 points: No astringency or off-taste was felt.

1 point: Taste was different from that of Comparative Example 1, but no clear astringency or off-taste was felt.

0 point: Astringency or off-taste was felt.

Test Example 1

Fat composition was prepared according to the formulation of Table 1 and the above (Preparation method), and evaluation was carried out according to the above (Evaluation method). Results are shown in Table 1.

[Table 1]

TABLE 1

| | Formulation of fat composition | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Oil phase | Rapeseed oil Palm Ace N | 100.000 | 99.9791 | 99.9625 | 99.9500 | 99.9250 | 99.8500 | 99.7750 | 99.7000 | 99.5000 |
| | PGPR | 0.0000 | 0.0084 | 0.0150 | 0.0200 | 0.0300 | 0.0600 | 0.0900 | 0.1200 | 0.2000 |
| Aqueous phase | Water | 0.0000 | 0.0075 | 0.0135 | 0.0180 | 0.0270 | 0.0540 | 0.0810 | 0.1080 | 0.1800 |
| phase | Tea extract | 0.0000 | 0.0050 | 0.0090 | 0.0120 | 0.0180 | 0.0360 | 0.0540 | 0.0720 | 0.1200 |
| | Sorbitol | 0.0 | 0.0 | 0.0 | 0.0 | 0.0 | 0.0 | 0.0 | 0.0 | 0.0 |
| | Ratio of sorbitol to tea extract | — | 0.0 | 0.0 | 0.0 | 0.0 | 0.0 | 0.0 | 0.0 | 0.0 |
| | Average particle size (nm) | — | 308 | 293 | 294 | 283 | 304 | 277 | 290 | 286 |
| | CDM (hr) at 120° C. | 5.6 | 7.4 | 8.4 | 9.3 | 10.4 | 13.9 | 16.7 | 18.3 | 19.4 |
| | Evaluation of astringency and off-taste | 2 | 2 | 2 | 2 | 1 | 1 | 0 | 0 | 0 |

| | Formulation of fat composition | Example 1 | Example 2 | Example 3 | Example 4 | Example 5 | Example 6 | Example 7 | Comparative Example 15 |
|---|---|---|---|---|---|---|---|---|---|
| Oil phase | Rapeseed oil Palm Ace N | 99.9695 | 99.9452 | 99.9270 | 99.8905 | 99.7810 | 99.6715 | 99.5620 | 99.2700 |
| | PGPR | 0.0084 | 0.0150 | 0.0200 | 0.0300 | 0.0600 | 0.0900 | 0.1200 | 0.2000 |
| Aqueous phase | Water | 0.0075 | 0.0135 | 0.0180 | 0.0270 | 0.0540 | 0.0810 | 0.1080 | 0.1800 |
| phase | Tea extract | 0.0050 | 0.0090 | 0.0120 | 0.0180 | 0.0360 | 0.0540 | 0.0720 | 0.1200 |
| | Sorbitol | 0.0096 | 0.0173 | 0.0230 | 0.0345 | 0.0690 | 0.1035 | 0.1380 | 0.2300 |
| | Ratio of sorbitol to tea extract | 1.9 | 1.9 | 1.9 | 1.9 | 1.9 | 1.9 | 1.9 | 1.9 |
| | Average particle size (nm) | 288 | 284 | 311 | 299 | 279 | 281 | 290 | 278 |
| | CDM (hr) at 120° C. | 8.4 | 10.0 | 12.0 | 13.7 | 21.4 | 27.3 | 33.0 | 43.6 |
| | Rate of increase in CDM value for sorbitol-free group (%) | 14 | 19 | 29 | 32 | 54 | 63 | 80 | 125 |

TABLE 1-continued

| | | | | | | | | |
|---|---|---|---|---|---|---|---|---|
| Evaluation of astringency and off-taste | 2 | 2 | 2 | 2 | 2 | 1 | 1 | 0 |

| Formulation of fat composition | | Comparative Example 10 | Comparative Example 11 | Comparative Example 12 | Comparative Example 13 | Comparative Example 14 |
|---|---|---|---|---|---|---|
| Oil phase | Rapeseed oil | | | | | |
| | Palm Ace N | 100.000 | 99.8500 | 99.7750 | 99.7000 | 99.5000 |
| | PGPR | 0.0000 | 0.0600 | 0.0900 | 0.1200 | 0.2000 |
| Aqueous phase | Water | 0.0000 | 0.0540 | 0.0810 | 0.1080 | 0.1800 |
| | Tea extract | 0.0000 | 0.0360 | 0.0540 | 0.0720 | 0.1200 |
| | Sorbitol | 0.0 | 0.0 | 0.0 | 0.0 | 0.0 |
| | Ratio of sorbitol to tea extract | — | 0.0 | 0.0 | 0.0 | 0.0 |
| | Average particle size (nm) | 296 | 288 | 290 | 310 | 294 |
| | CDM (hr) at 120° C. | 11.0 | 30.8 | 34.8 | 37.3 | 46.4 |
| | Evaluation of astringency and off-taste | 2 | 1 | 0 | 0 | 0 |

| Formulation of fat composition | | Example 8 | Example 9 | Example 10 | Comparative Example 16 |
|---|---|---|---|---|---|
| Oil phase | Rapeseed oil | | | | |
| | Palm Ace N | 99.7810 | 99.6715 | 99.5620 | 99.2700 |
| | PGPR | 0.0600 | 0.0900 | 0.1200 | 0.2000 |
| Aqueous phase | Water | 0.0540 | 0.0810 | 0.1080 | 0.1800 |
| | Tea extract | 0.0360 | 0.0540 | 0.0720 | 0.1200 |
| | Sorbitol | 0.0690 | 0.1035 | 0.1380 | 0.2300 |
| | Ratio of sorbitol to tea extract | 1.9 | 1.9 | 1.9 | 1.9 |
| | Average particle size (nm) | 280 | 304 | 299 | 300 |
| | CDM (hr) at 120° C. | 43.0 | 57.5 | 69.7 | 90.6 |
| | Rate of increase in CDM value for sorbitol-free group (%) | 40 | 65 | 87 | 95 |
| | Evaluation of astringency and off-taste | 2 | 1 | 1 | 0 |

The oxidative stability of the fat composition was more improved by adding a tea extract and sorbitol in combination than the tea extract alone. The effect was more effective as the amount of the tea extract was higher.

Astringency and off-taste also tended to be reduced when sorbitol was used in combination with the tea extract. The same effect was observed with palm olein.

Test Example 2

Fat composition was prepared according to the formulation of Table 2 and the above (Preparation method), and evaluation was carried out according to the above (Evaluation method). Results are shown in Table 2.

However, for Examples 14 and 15, separate aqueous phases of tea extract and sorbitol were prepared and used. That is, for Example 14, 0.036 parts of tea extract and 0.054 parts of water were mixed, and 0.069 parts of sorbitol and 0.045 parts of water were mixed, and for Example 15, 0.036 parts of tea extract and 0.054 parts of water were mixed, and 0.138 parts of sorbitol and 0.09 parts of water were mixed, to prepare the each aqueous phases of the tea extract solution and the sorbitol solution.

Half of the oil phase part was set to be 25° C., and the tea extract solution was blended while stirring by HOMO-MIXER (TK homomixer MARKII: available from PRIMIX Corporation) at 8,000 rpm. Stirring was performed in this state for 10 minutes to obtain intermediate A. Another half of the oil phase part was set to be 25° C., and the tea extract solution was blended while stirring in the same way. Stirring was performed in this state for 10 minutes to obtain intermediate B. Intermediates A and B were mixed to obtain a fat composition containing tea extract and sorbitol.

TABLE 2

| Formulation of fat composition | | Comparative Example 1 | Comparative Example 6 | Comparative Example 17 | Comparative Example 18 | Example 11 | Example 5 | Example 12 | Example 13 | Comparative Example 19 |
|---|---|---|---|---|---|---|---|---|---|---|
| Oil phase | Rapeseed oil | 100.000 | 99.8500 | 99.8485 | 99.8425 | 99.8275 | 99.7810 | 99.6640 | 99.1690 | 98.3740 |
| | PGPR | | 0.0600 | 0.0600 | 0.0600 | 0.0600 | 0.0600 | 0.1200 | 0.3000 | 0.6000 |
| Aqueous phase | Water | 0.0000 | 0.0540 | 0.0540 | 0.0540 | 0.0540 | 0.0540 | 0.0540 | 0.1500 | 0.3000 |
| | Tea extract | 0.0000 | 0.0360 | 0.0360 | 0.0360 | 0.0360 | 0.0360 | 0.0360 | 0.0360 | 0.0360 |
| | Sorbitol | 0.0 | 0.0000 | 0.0015 | 0.0075 | 0.0225 | 0.0690 | 0.1260 | 0.3450 | 0.6900 |
| | Ratio of sorbitol to tea extract | — | 0.00 | 0.04 | 0.2 | 0.6 | 1.9 | 3.5 | 9.6 | 19.2 |
| | Average particle size (nm) | — | 298 | 303 | 293 | 288 | 279 | 282 | 310 | 313 |
| | CDM (hr) at 120° C. | 5.6 | 13.9 | 13.7 | 14.8 | 18.4 | 21.4 | 24.1 | 18.3 | 14.3 |
| | Rate of increase in CDM value for sorbitol-free group (%) | — | — | −1 | 6 | 32 | 54 | 73 | 32 | 3 |
| | Evaluation of astringency and off-taste | 2 | 1 | 1 | 1 | 2 | 2 | 2 | 2 | 2 |

| Formulation of fat composition | | Comparative Example 20 | Comparative Example 21 | Comparative Example 22 | Example 14 | Example 15 |
|---|---|---|---|---|---|---|
| Oil phase | Rapeseed oil | 99.9205 | 99.8410 | 99.6520 | 99.6760 | 99.5020 |
| | PGPR | 0.0225 | 0.0450 | 0.1200 | 0.1200 | 0.1800 |
| Aqueous phase | Water | 0.0225 | 0.0450 | 0.0900 | 0.0990 | 0.1440 |
| | Tea extract | 0.0 | 0.0 | 0.0 | 0.0360 | 0.0360 |
| | Sorbitol | 0.0345 | 0.0690 | 0.1380 | 0.0690 | 0.1380 |
| | Ratio of sorbitol to tea extract | | | | 1.9 | 3.8 |
| | Average particle size (nm) | 278 | 288 | 307 | 303 | 299 |
| | CDM (hr) at 120° C. | 5.2 | 5.1 | 5.5 | 21.8 | 24.1 |
| | Rate of increase in CDM value for sorbitol-free group (%) | −7 | −9 | −2 | 57 | 73 |
| | Evaluation of astringency and off-taste | 2 | 2 | 2 | 2 | 2 |

The effect on oxidative stability varied depending on the amount of sorbitol added to the tea extract. The adding amount of sorbitol at 0.5 to 15 times as much as the tea extract was appropriate.

It was found that sorbitol alone did not improve the oxidative stability. The tea extract and sorbitol did not need to be present in the same aqueous solution.

Test Example 3

The effects of polyhydric alcohols, sugar alcohols, and sugars other than sorbitol were tested.

Fat composition was prepared according to the formulation of Table 3 and the above (Preparation method), and evaluation was carried out according to the above (Evaluation method). Results are shown in Table 3.

In the evaluation of CDM value, the percentage increase (%) of CDM value compared to the group of not adding each components, which are polyhydric alcohols, sugar alcohols, and sugars other than sorbitol, was determined and compared to the effect of sorbitol (Example 5) (Example 7).

TABLE 3

| Formulation of fat composition | | Comparative Example 6 | Comparative Example 8 | Example 5 | Example 7 | Comparative Example 23 | Comparative Example 24 | Comparative Example 25 | Comparative Example 26 | Comparative Example 27 | Comparative Example 28 |
|---|---|---|---|---|---|---|---|---|---|---|---|
| Oil phase | Rapeseed oil | 99.850 | 99.700 | 99.781 | 99.562 | 99.781 | 99.562 | 99.751 | 99.502 | 99.766 | 99.532 |
| | PGPR | 0.060 | 0.120 | 0.060 | 0.120 | 0.060 | 0.120 | 0.090 | 0.180 | 0.060 | 0.120 |
| Aqueous phase | Water | 0.054 | 0.108 | 0.054 | 0.108 | 0.054 | 0.108 | 0.054 | 0.108 | 0.069 | 0.138 |
| | Tea extract | 0.036 | 0.072 | 0.036 | 0.072 | 0.036 | 0.072 | 0.036 | 0.072 | 0.036 | 0.072 |
| | Sorbitol | | | 0.069 | 0.138 | | | | | | |
| | Sucrose | | | | | 0.069 | 0.138 | | | | |
| | Glycerin | | | | | | | 0.069 | 0.138 | | |
| | Erythritol | | | | | | | | | 0.069 | 0.138 |
| | Ratio of each component to tea extract | 0.0 | 0.0 | 1.9 | 1.9 | 1.9 | 1.9 | 1.9 | 1.9 | 1.9 | 1.9 |
| | Average particle size (nm) | 304 | 290 | 279 | 290 | 291 | 300 | 304 | 279 | 304 | 301 |
| | CDM (hr) at 120° C. | 13.9 | 18.3 | 21.4 | 33.0 | 12.1 | 11.5 | 14.0 | 14.0 | 13.8 | 15.7 |
| | Rate of increase in CDM value for groups not containing each component (%) | | | 54 | 80 | −13 | −37 | 1 | −23 | −1 | −14 |
| | Evaluation of astringency and off-taste | 2 | 1 | 2 | 1 | 2 | 1 | 1 | 0 | 2 | 1 |

| Formulation of fat composition | | Comparative Example 29 | Comparative Example 30 | Comparative Example 31 | Comparative Example 32 | Comparative Example 33 | Comparative Example 34 | Comparative Example 35 | Comparative Example 36 | Comparative Example 37 | Comparative Example 38 |
|---|---|---|---|---|---|---|---|---|---|---|---|
| Oil phase | Rapeseed oil | 99.766 | 99.532 | 99.781 | 99.562 | 99.781 | 99.562 | 99.781 | 99.562 | 99.781 | 99.562 |
| | PGPR | 0.060 | 0.120 | 0.060 | 0.120 | 0.060 | 0.120 | 0.060 | 0.120 | 0.060 | 0.120 |
| Aqueous phase | Water | 0.069 | 0.138 | 0.054 | 0.108 | 0.054 | 0.108 | 0.054 | 0.108 | 0.054 | 0.108 |
| | Tea extract | 0.036 | 0.072 | 0.036 | 0.072 | 0.036 | 0.072 | 0.036 | 0.072 | 0.036 | 0.072 |
| | Mannitol | 0.069 | 0.138 | | | | | | | | |
| | Lacitol | | | 0.069 | 0.138 | | | | | | |
| | Maltitol | | | | | 0.069 | 0.138 | | | | |
| | Glucose | | | | | | | 0.069 | 0.138 | | |
| | Trehalose | | | | | | | | | 0.069 | 0.138 |
| | Ratio of each component to tea extract | 1.9 | 1.9 | 1.9 | 1.9 | 1.9 | 1.9 | 1.9 | 1.9 | 1.9 | 1.9 |
| | Average particle size (nm) | 286 | 297 | 279 | 301 | 292 | 277 | 311 | 294 | 293 | 290 |
| | CDM (hr) at 120° C. | 13.0 | 16.8 | 12.6 | 17.9 | 14.0 | 20.7 | 10.6 | 12.6 | 8.1 | 9.7 |
| | Rate of increase in CDM value for groups not containing each component (%) | −6 | −8 | −9 | −2 | 1 | 13 | −24 | −31 | −42 | −47 |
| | Evaluation of astringency and off-taste | 2 | 1 | 2 | 1 | 2 | 1 | 2 | 1 | 2 | 1 |

Only sorbitol showed the effect of improving oxidative stability with the tea extract, and it was specific effect.

OStorage Test Result for Fat Composition (Standing at 60° C.)

(Evaluation of Oxidation Stability of Fat Composition Containing Tea Extract and Sorbitol)

Astringency and off-taste of the product: Taste evaluation was carried out by four trained panelists. Taste evaluation point was determined by agreement by the panelists. When the point was 1 or more, astringency and off-taste were regarded as acceptable.

2 points: No astringency or off-taste was felt.

1 point: Taste was different from that of Comparative Example 1, but no clear astringency or off-taste was felt.

0 point: Astringency or off-taste was felt.

The rapeseed oil preparation at 80 g was put into a 100 ml glass bottle, and then the bottle was sealed.

The glass bottle was stored in dark at 60° C. for 28 days.

After storage, the peroxide value (POV) was measured and the taste evaluation was carried out. The taste evaluation regarding the degraded odor of fat as the evaluation item was carried out by four panelists on 10-point scale. Fat with an evaluation score of 5 or higher at the 21st day of storage was regarded as good.

Sensory evaluation, degraded odor of fat: The higher the number, the weaker the degraded odor; the lower the number, the stronger the degraded odor.

TABLE 4

| Fat composition | Evaluation of astringency and off-taste | POV (meq/kg)/storage days | | | | | Sensory evaluation/ storage days | | | | |
|---|---|---|---|---|---|---|---|---|---|---|---|
| | | 0 | 7 | 14 | 21 | 28 | 0 | 7 | 14 | 21 | 28 |
| Comparative Example 1 | 2 | 0.9 | 8.3 | 18.9 | 36.2 | 68.0 | 10 | 6 | 3 | 1 | 0 |
| Comparative Example 5 | 1 | 0.9 | 4.0 | 7.9 | 14.6 | 24.0 | 10 | 8 | 6 | 4 | 2 |
| Comparative Example 6 | 1 | 0.9 | 2.8 | 5.8 | 9.8 | 15.0 | 10 | 9 | 7 | 5 | 4 |
| Comparative Example 8 | 0 | 0.9 | 2.0 | 3.9 | 6.8 | 11.8 | 10 | 9 | 8 | 6 | 5 |
| Example 4 | 2 | 0.9 | 3.0 | 5.9 | 9.4 | 15.7 | 10 | 9 | 7 | 6 | 5 |
| Example 5 | 2 | 0.9 | 2.2 | 3.9 | 6.4 | 10.8 | 10 | 9 | 8 | 7 | 6 |
| Example 7 | 1 | 0.9 | 1.5 | 2.4 | 4.3 | 7.9 | 10 | 9 | 9 | 8 | 7 |

Examples maintained good POV and taste compared to those with equivalent tea extract content. The quality of Examples were equivalent to that of the Comparative Examples with twice the amount of tea extract. It was also found that Examples were superior in terms of astringency and off-taste.

OApplication Evaluation (Storage Test with Spraying on Rice Cracker)

(Production Method of Rice Cracker and Evaluation Method)

Rice cracker was prepared by spraying 20 parts of each fat composition onto 80 parts of commercially available rice cracker (non-oil, no flavoring).

Taste evaluation of the rice cracker was carried out. The results are shown in table 5.

Astringency and off-taste of the product: Taste evaluation was carried out by four trained panelists. Taste evaluation point was determined by agreement by the panelists. When the point was 1 or more, astringency and off-taste were regarded as acceptable.

2 points: No astringency or off-taste was felt.

1 point: Taste was different from that of Comparative Example 1, but no clear astringency or off-taste was felt.

0 point: Astringency or off-taste was felt.

Rice cracker was placed in an aluminum vapor-deposited bag, stored at 60° C. in the dark, and the POV of the fat extracted from the rice cracker with hexane was measured over time.

The taste after storage was evaluated. The taste evaluation regarding the degraded odor of fat as the evaluation item was carried out by four panelists on 10-point scale. Fat with an evaluation score of 5 or higher at the 7th day of storage was regarded as good.

Sensory evaluation, degraded odor of fat: The higher the number, the weaker the degraded odor; the lower the number, the stronger the degraded odor.

TABLE 5

| | Fat composition | Evaluation of astringency and off-taste | POV (meq/kg)/ storage days | | | Sensory evaluation/ storage days | | |
|---|---|---|---|---|---|---|---|---|
| | | | 0 | 7 | 14 | 0 | 7 | 14 |
| Comparative Example 39 | Comparative Example 1 | 2 | 1.1 | 55.3 | 149.1 | 10 | 2 | 0 |
| Comparative Example 40 | Comparative Example 5 | 1 | 1.1 | 31.1 | 78.9 | 10 | 3 | 0 |
| Comparative Example 41 | Comparative Example 6 | 1 | 1.0 | 21.9 | 44.2 | 10 | 4 | 1 |
| Comparative Example 42 | Comparative Example 8 | 0 | 1.1 | 11.2 | 24.8 | 10 | 6 | 3 |
| Example 16 | Example 4 | 2 | 1.1 | 20.3 | 42.1 | 10 | 5 | 1 |
| Example 17 | Example 5 | 2 | 1.0 | 11.6 | 20.2 | 10 | 6 | 3 |
| Example 18 | Example 7 | 1 | 1.1 | 6.2 | 12.8 | 10 | 7 | 5 |

Examples maintained good POV and taste compared to those with equivalent tea extract content. The quality of Examples were equivalent to that of the Comparative Examples with twice the amount of tea extract. It was also found that Examples were superior in terms of astringency and off-taste. The same result was obtained as for fat composition only.

INDUSTRIAL APPLICABILITY

The present invention provides an edible fat with improved oxidative stability and good taste that may be used in all kinds of foods without increasing the amount of tea extract in the fat containing tea extract.

The invention claimed is:

1. A fat composition comprising 50 to 1000 ppm by mass tea extract, and sorbitol at 0.5 to 15 times as much as the tea extract.

2. The fat composition according to claim 1, comprising an oil-soluble emulsifier.

3. The fat composition according to claim 1, wherein an average particle size of an aqueous phase of the composition is 1000 nm or less.

4. The fat composition according to claim 1, comprising 80 to 800 ppm by mass tea extract.

5. A food comprising the fat composition of claim 1.

* * * * *